US012066768B2

(12) United States Patent
Kaneko

(10) Patent No.: US 12,066,768 B2
(45) Date of Patent: Aug. 20, 2024

(54) IMAGE FORMING APPARATUS

(71) Applicant: BROTHER KOGYO KABUSHIKI KAISHA, Nagoya (JP)

(72) Inventor: Tomoya Kaneko, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/312,632

(22) Filed: May 5, 2023

(65) Prior Publication Data

US 2023/0273545 A1 Aug. 31, 2023

Related U.S. Application Data

(63) Continuation of application No. 17/551,481, filed on Dec. 15, 2021, now Pat. No. 11,650,517, which is a continuation of application No. 17/098,803, filed on Nov. 16, 2020, now Pat. No. 11,204,567.

(30) Foreign Application Priority Data

Nov. 19, 2019 (JP) ................................ 2019-208361

(51) Int. Cl.
*G03G 15/00* (2006.01)
*G03G 15/08* (2006.01)

(52) U.S. Cl.
CPC ..... *G03G 15/0863* (2013.01); *G03G 15/0865* (2013.01); *G03G 2215/0697* (2013.01)

(58) Field of Classification Search
CPC ........... G03G 15/0863; G03G 15/0865; G03G 21/1878
USPC ........................................................... 399/12
See application file for complete search history.

(56) References Cited

U.S. PATENT DOCUMENTS

| | | | |
|---|---|---|---|
| 6,144,812 A | 11/2000 | Ueno | |
| 7,158,739 B2 | 1/2007 | Ohara et al. | |
| 9,158,258 B2 | 10/2015 | Hayakawa | |
| 9,904,227 B2 | 2/2018 | Kanakubo | |
| 11,204,567 B2 | 12/2021 | Kaneko | |
| 2004/0207865 A1 | 10/2004 | Wachter et al. | |
| 2019/0302689 A1* | 10/2019 | Suzuki | G03G 21/1878 |

FOREIGN PATENT DOCUMENTS

| | | |
|---|---|---|
| JP | 2018-509648 A | 4/2018 |
| WO | 2016/171694 A1 | 10/2016 |

* cited by examiner

*Primary Examiner* — Hoan H Tran
(74) *Attorney, Agent, or Firm* — Merchant & Gould P.C.

(57) ABSTRACT

An image forming apparatus including a main unit, a main unit memory, a drum cartridge, a toner cartridge, and a controller. The main unit memory stores printer identification information. The drum cartridge including a drum memory that stores drum identification information. The toner cartridge including a toner memory that stores toner identification information. The controller is configured to store in the main unit memory the drum identification information stored in the drum memory and store in the drum memory the printer identification information stored in the main unit memory, if it determines that the drum cartridge installed in the main unit is new, and store in the main unit memory the toner identification information stored in the toner memory and store in the toner memory the drum identification information stored in the drum memory, if it determines that the toner cartridge installed in the main unit is new.

3 Claims, 9 Drawing Sheets

IMAGE FORMING APPARATUS

CROSS-REFERENCE TO RELATED APPLICATION(S)

The present application is a continuation of U.S. application Ser. No. 17/551,481, filed Dec. 15, 2021, which is a continuation of U.S. application Ser. No. 17/098,803, filed Nov. 16, 2020, now U.S. Pat. No. 11,204,567, which claims priority from Japanese Patent Application No. 2019-208361 filed on Nov. 19, 2019, the disclosures of which are incorporated herein by reference in their entirety.

TECHNICAL FIELD

The present disclosure relates to an image forming apparatus in which a drum cartridge and a toner cartridge are installable.

BACKGROUND ART

An image forming apparatus in which a user-replaceable toner cartridge includes a memory is known in the art. In this image forming apparatus, when a new toner cartridge is installed, a printer ID of the image forming apparatus is written in a memory of the toner cartridge, and the toner cartridge is allowed to be used if the printer ID of the image forming apparatus and the printer ID stored in the memory of the toner cartridge are identical.

SUMMARY

However, an image forming apparatus in which two types of cartridges, i.e., a drum cartridge and a toner cartridge, are installable had not been taken into consideration.

In one aspect, an image forming apparatus is disclosed herein which comprises an apparatus main unit, a main unit memory, a drum cartridge installed in the apparatus main unit, a toner cartridge installed in the apparatus main unit, and a controller. The main unit memory stores printer identification information which identifies the image forming apparatus. The drum cartridge comprises a photoconductor drum, and a drum memory that stores drum identification information which identifies the drum cartridge. The toner cartridge comprises a case containing toner inside, and a toner memory that stores toner identification information which identifies the toner cartridge.

The controller is configured to determine whether the drum cartridge installed in the apparatus main unit is new, store in the main unit memory the drum identification information stored in the drum memory and store in the drum memory the printer identification information stored in the main unit memory, if the controller determines that the drum cartridge installed in the apparatus main unit is new. The controller is further configured to determine whether the toner cartridge installed in the apparatus main unit is new, and store in the main unit memory the toner identification information stored in the toner memory and store in the toner memory the drum identification information stored in the drum memory, if the controller determines that the toner cartridge installed in the apparatus main unit is new.

BRIEF DESCRIPTION OF THE DRAWINGS

The above and other aspects, their advantages and further features will become more apparent in detail illustrative, non-limiting description with reference to the accompanying drawings, in which.

DESCRIPTION OF EMBODIMENTS

A detailed description will be given of a non-limiting embodiment with reference made to the drawings where appropriate.

Figure 1:
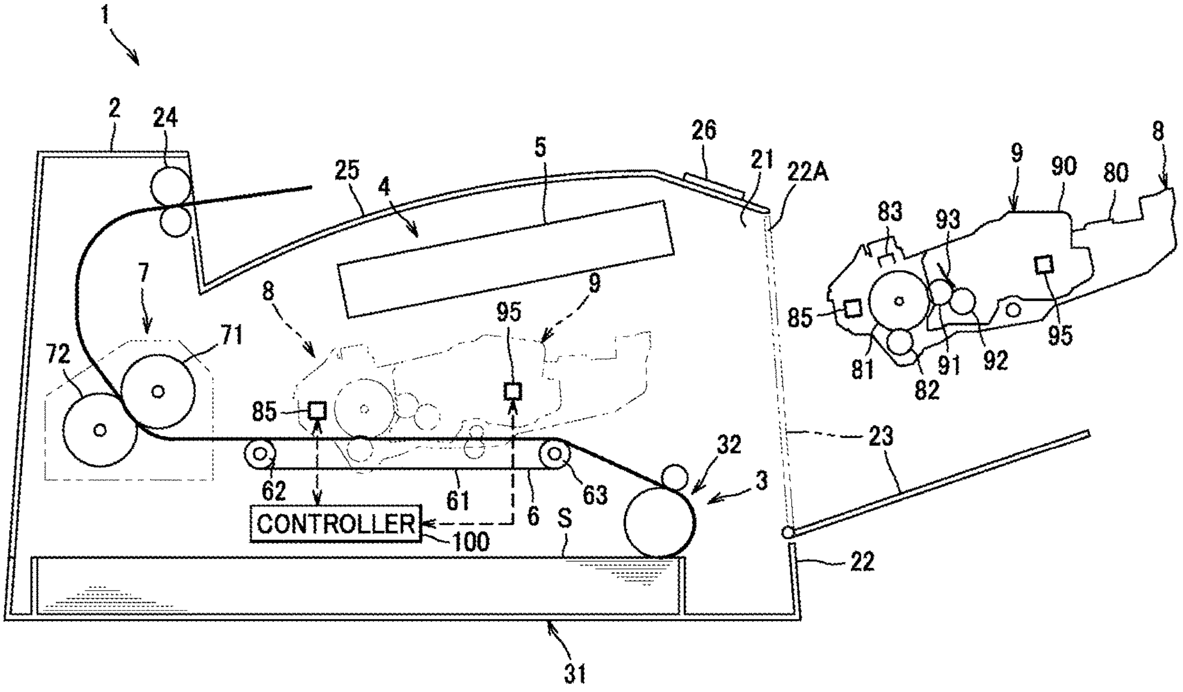
FIG. 1 is a sectional view of an image forming apparatus.

As shown in FIG. 1, an image forming apparatus 1 is a monochrome laser printer. The image forming apparatus 1 includes an apparatus main unit 2, a feeder unit 3, an image forming unit 4, a controller 100 and a display 26.

The apparatus main unit 2 is configured as a hollow case. The apparatus main unit 2 includes a pair of left and right side walls 21, and a front wall 22 connecting the side walls 21. The front wall 22 has a main unit opening 22A. A front cover 23 is provided on the front wall 22 for opening and closing the main unit opening 22A.

The feeder unit 3 comprises a feeding tray 31, and a conveyor mechanism 32. The feeding tray 31 is removably installed in the lower part of the apparatus main unit 2. The conveyor mechanism 32 is configured to convey sheets S on the feeding tray 31 toward the image forming unit 4.

The image forming unit 4 includes a scanner unit 5, a belt unit 6, a fixing device 7, a drum cartridge 8, and a toner cartridge 9.

The scanner unit 5 is arranged in the upper part of the apparatus main unit 2 and includes a laser emitting unit, a polygon mirror, lenses, reflectors, etc., which are not shown. This scanner unit 5 is configured to emit a laser beam that rapidly scans the surface of a photoconductor drum 81 which will be described later.

The belt unit 6 includes a belt 61, a drive roller 62, and a follower roller 63. The belt unit 6 is installable in and removable from the apparatus main unit 2.

Figure 2:
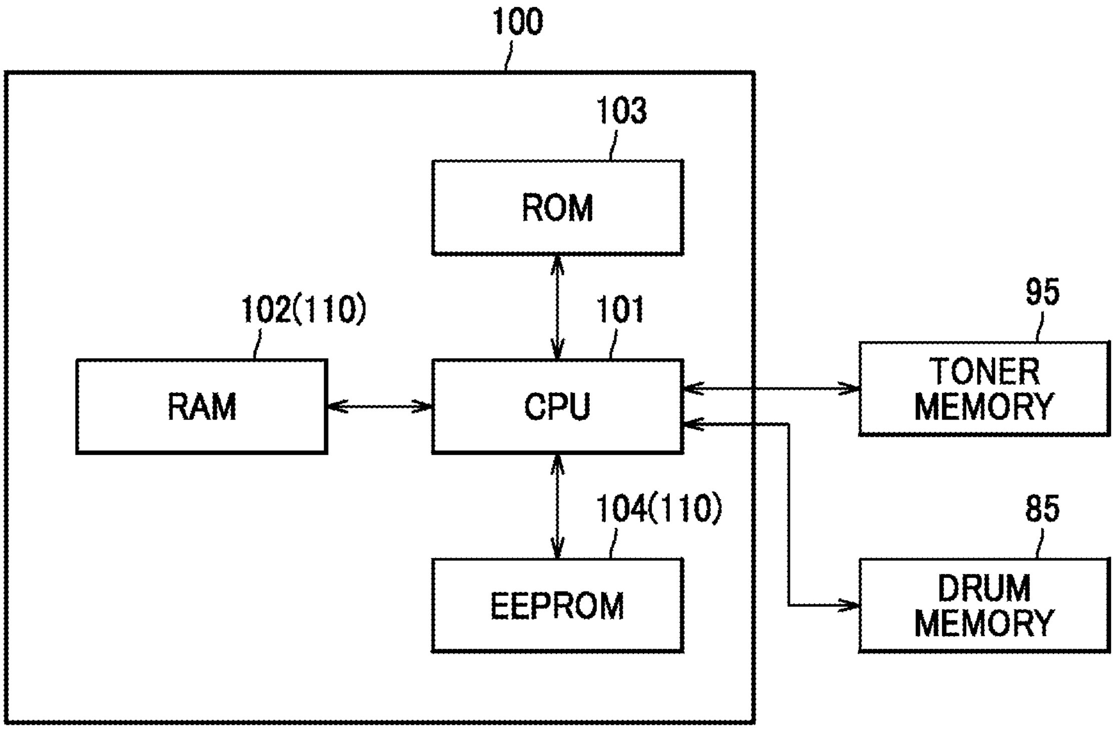
FIG. 2 is a diagram showing an electrical connection between a controller, a main unit memory, a drum memory and a toner memory.

As shown in FIG. 2, the controller 100 includes, for example, a CPU 101, a RAM 102, a ROM 103, an EEPROM 104, and an input/output circuit, and controls printing by performing an arithmetic-logic process based on information on the installed cartridges and programs and/or data stored in the RAM 102, the ROM103, etc. The RAM 102 and the EEPROM 104 are an example of a main unit memory 110. Further, the RAM 102 is an example of a volatile memory. The CPU 101 is electrically connected to the RAM 102, the ROM 103, the EEPROM 104, and a drum memory 85 and a toner memory 95 described later. The EEPROM 104 is an example of a nonvolatile memory.

Returning to FIG. 1, the display 26 is arranged on the outer surface of the apparatus main unit 2. The display 26 displays various messages based on commands from the controller 100.

The drum cartridge 8 is disposed between the feeder unit 3 and the scanner unit 5. The drum cartridge 8 is installable in and removable from the apparatus main unit 2. Specifically, the drum cartridge 8 is installable in and removable from the apparatus main unit 2 through the main unit opening 22A which can be opened and closed by the front cover 23 of the apparatus main unit 2.

The toner cartridge 9 is installable in the apparatus main unit 2. The toner cartridge 9 herein is configured to be attachable to and detachable from the drum cartridge 8. To install the toner cartridge 9, the toner cartridge 9 is attached to the drum cartridge 8 and the drum cartridge 8 with the toner cartridge 9 is installed in the apparatus main unit 2.

The drum cartridge 8 includes a frame 80, a photoconductor drum 81, a transfer roller 82, a charger 83, and the drum memory 85. The frame 80 is configured to allow the toner cartridge 9 to be mounted thereon. The photoconductor drum 81 and the transfer roller 82 are rotatably supported at the frame 80.

The drum memory 85 is, for example, a medium such as an IC chip for storing information, but is not limited to an IC chip.

The toner cartridge 9 includes a case 90, a development roller 91, a supply roller 92, a blade 93, and the toner memory 95. The case 90 can contain toner inside. The development roller 91 supplies toner to the photoconductor drum 81. The supply roller 92 supplies toner in the case 90 to the development roller 91. The blade 93 limits thickness of the layer of toner supplied to the development roller 91.

The toner memory 95 is, for example, a medium such as an IC chip for storing information, but is not limited to an IC chip. The toner memory 95 is an example of a nonvolatile memory.

In the drum cartridge 8, the surface of the rotating photoconductor drum 81 is uniformly charged by the charger 83, and then exposed to the laser beam emitted from the scanner unit 5 and rapidly scanning the surface of the photoconductor drum 81. This causes the potential of the exposed portions to drop and forms an electrostatic latent image based on image data on the surface of the photoconductor drum 81.

Subsequently, toner in the toner cartridge 9 is supplied to the electrostatic latent image on the photoconductor drum 81 by the rotating development roller 91, and a toner image is formed on the surface of the photoconductor drum 81. When a sheet S is conveyed between the photoconductor drum 81 and the transfer roller 82, the toner image carried on the surface of the photoconductor drum 81 is transferred on to the sheet S.

The fixing device 7 includes a heating roller 71 and a pressure roller 72. The pressure roller 72 is positioned to face the heating roller 71. The pressure roller 72 presses the heating roller 71. The fixing device 7 thermally fixes the toner transferred to the sheet S while the sheet S passes between the heating roller 71 and the pressure roller 72.

The sheet S with a toner image thermally fixed thereon by the fixing device 7 is conveyed to sheet ejection rollers 24 positioned downstream of the fixing device 7, and sent through the sheet ejection rollers 24 out on to a sheet output tray 25.

Figure 3A:
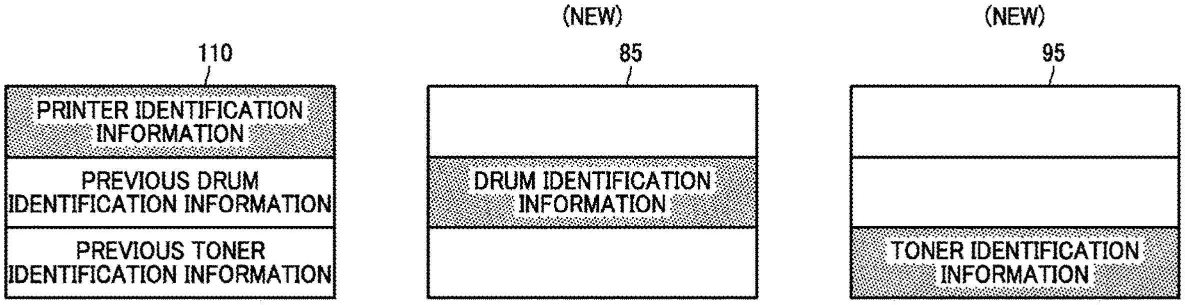
FIG. 3A is a diagram showing identification information stored in the main unit memory, identification information stored in the drum memory of a new drum cartridge, and identification information stored in the toner memory of a new toner cartridge before the cartridges are installed.

As shown in FIG. 3A, the main unit memory 110 stores printer identification information which identifies the image forming apparatus 1. The printer identification information is unique identification information predetermined for each individual printer. The unique identification information is shown in the figures by dot hatch patterns. The main unit memory 110 also stores identification information of a drum cartridge 8 and identification information of a toner cartridge 9, unless the image forming apparatus 1 is used for the first time.

The drum memory 85 stores drum identification information which identifies the drum cartridge 8. The drum identification information is unique identification information predetermined for each individual drum cartridge 8. When the drum cartridge 8 is new, only drum identification information is stored in the drum memory 85, and no information is stored in a specific storage area for storing printer identification information.

The toner memory 95 stores toner identification information which identifies the toner cartridge 9. The toner identification information is unique identification information predetermined for each individual toner cartridge 9. When the toner cartridge 9 is new, only toner identification information is stored in the toner memory 95, and no information is stored in a specific storage area for storing drum identification information.

If the controller 100 determines that power has been turned on or the front cover 23 has been closed, the controller 100 executes drum cartridge authentication and toner cartridge authentication based on the assumption that at least one of the drum cartridge 8 and the toner cartridge 9 has been changed. The controller 100 is herein configured to allow execution of image forming only if drum cartridge authentication and toner cartridge authentication are successful.

Drum cartridge authentication executed by the controller 100 will be explained.

When the controller 100 executes drum cartridge authentication, the controller 100 first determines if a drum cartridge 8 is installed in the apparatus main unit 2. To be more specific, the controller 100 tries to communicate with a drum memory 85, and when communication is established between the controller 100 and a drum memory 85, then determines that a drum cartridge 8 is installed in the apparatus main unit 2. Alternatively, the controller 100 may be configured to use contact sensors or non-contact sensors such as optical sensors to determine whether a drum cartridge 8 is installed.

Next, the controller 100 determines whether the drum cartridge 8 installed in the apparatus main unit 2 is new.

Specifically, the controller 100 first determines whether information is stored in the specific storage area of the drum memory 85. When the controller 100 determines that information is not stored in the specific storage area of the drum memory 85, the controller 100 determines that the drum cartridge 8 installed in the apparatus main unit 2 is new. On the other hand, when the controller 100 determines that information is stored in the specific storage area of the drum memory 85, the controller 100 determines that the drum cartridge 8 installed in the apparatus main unit 2 is not new. More specifically, the controller 100 is herein configured to determine that the drum cartridge 8 installed in the apparatus main unit 2 is not new when printer identification information is stored in the drum memory 85.

Figure 3B:
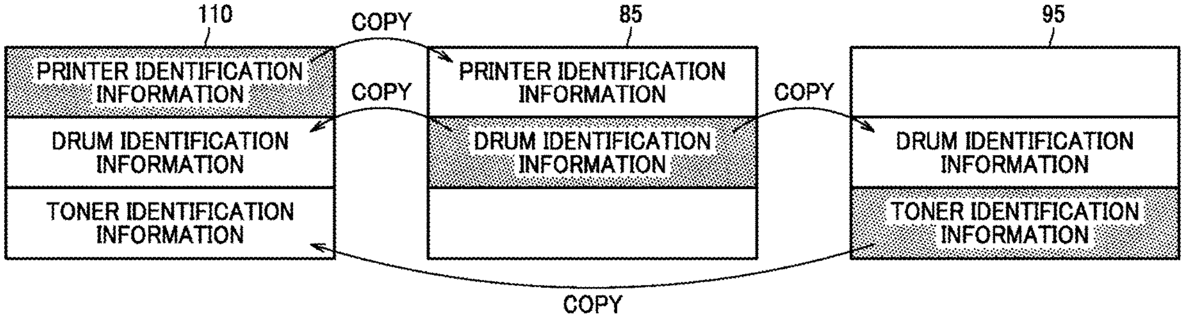
FIG. 3B is a diagram showing identification information stored in the main unit memory, identification information stored in the drum memory, and identification information stored in the toner memory after the cartridges are installed.

When the controller 100 determines that the drum cartridge 8 installed in the apparatus main unit 2 is new, the controller 100 copies and stores in the main unit memory 110 the drum identification information stored in the drum memory 85, and copies and stores in the drum memory 85 the printer identification information stored in the main unit memory 110, as shown in FIG. 3B. In addition, when the controller 100 determines that the drum cartridge 8 is new, the controller 100 determines that authentication of the drum cartridge 8 succeeds.

It is to be understood that when previous drum identification information is stored in the main unit memory 110, it is overwritten by the drum identification information of the drum cartridge 8 determined to be new.

When the controller 100 determines that the drum cartridge 8 installed in the apparatus main unit 2 is not new, the controller determines whether the printer identification information stored in the main unit memory 110 and the printer identification information stored in the drum memory 85 are identical.

When the controller 100 determines that the printer identification information stored in the main unit memory 110 and the printer identification information stored in the drum memory 85 are identical, the controller 100 determines that authentication of the drum cartridge 8 succeeds.

On the other hand, when the controller 100 determines that the printer identification information stored in the main unit memory 110 and the printer identification information stored in the drum memory 85 are not identical, the controller 100 causes a drum cartridge error to be displayed on the display 26.

Toner cartridge authentication executed by the controller 100 will be explained.

When the controller 100 executes toner cartridge authentication, the controller 100 first determines whether a toner cartridge 9 is installed in the apparatus main unit 2. The controller 100 is herein configured to try to communicate with a toner memory 95, and when communication is established between the controller 100 and a toner memory 95, then determines that a toner cartridge 9 is installed in the apparatus main unit 2. Alternatively, the controller 100 may be configured to use contact sensors or non-contact sensors such as optical sensors to determine whether a toner cartridge 9 is installed.

Next, the controller 100 determines whether the toner cartridge 9 installed in the apparatus main unit 2 is new.

Specifically, the controller 100 first determines whether information is stored in a specific storage area of the toner memory 95. When the controller 100 determines that information is not stored in the specific storage area of the toner memory 95, the controller 100 determines that the toner cartridge 9 installed in the apparatus main unit 2 is new. On the other hand, when the controller 100 determines that information is stored in the specific storage area of the toner memory 95, the controller 100 determines that the toner cartridge 9 installed in the apparatus main unit 2 is not new. More specifically, the controller 100 is herein configured to determine that the toner cartridge 9 installed in the apparatus main unit 2 is not new when drum identification information is stored in the toner memory 95, as shown in FIG. 3B.

When the controller 100 determines that the toner cartridge 9 installed in the apparatus main unit 2 is new, the controller 100 copies and stores in the main unit memory 110 the toner identification information stored in the toner memory 95, and copies and stores in the toner memory 95 the drum identification information stored in the drum memory 85, as shown in FIG. 3B. In addition, when the controller 100 determines that the toner cartridge 9 is new, the controller 100 determines that authentication succeeds.

It is to be understood that when previous toner identification information is stored in the main unit memory 110, it is overwritten by the toner identification information of the toner cartridge 9 determined to be new.

On the other hand, when the controller 100 determines that the toner cartridge 9 installed in the apparatus main unit 2 is not new, the controller executes the process of determining whether the drum identification information stored in the drum memory 85 and the drum identification information stored in the toner memory 95 are identical. Further, the controller 100 determines whether the toner identification information stored in the toner memory 95 and the toner identification information stored in the main unit memory 110 are identical.

When the controller 100 determines that the drum identification information in the toner memory 95 and the drum identification information in the drum memory 85 are identical, and that the toner identification information in the toner memory 95 and the toner identification information in the main unit memory 110 are identical, the controller 100 determines that authentication of the toner cartridge 9 succeeds.

On the other hand, when the controller 100 determines that the toner identification information in the toner memory 95 and the toner identification information in the main unit memory 110 are not identical, the controller 100 causes a toner cartridge error to be displayed on the display 26.

When the controller 100 determines that the drum identification information in the toner memory 95 and the drum identification information in the drum memory 85 are not identical, and that the toner identification information in the toner memory 95 and the toner identification information in the main unit memory 110 are identical, the controller 100 copies and stores in the toner memory 95 the drum identification information stored in the drum memory 85. Subsequently, the controller 100 determines that authentication of the toner cartridge has succeeded.

Next, an example process executed by the controller 100 will be explained with reference to FIGS. 4 to 6.

Figure 4:
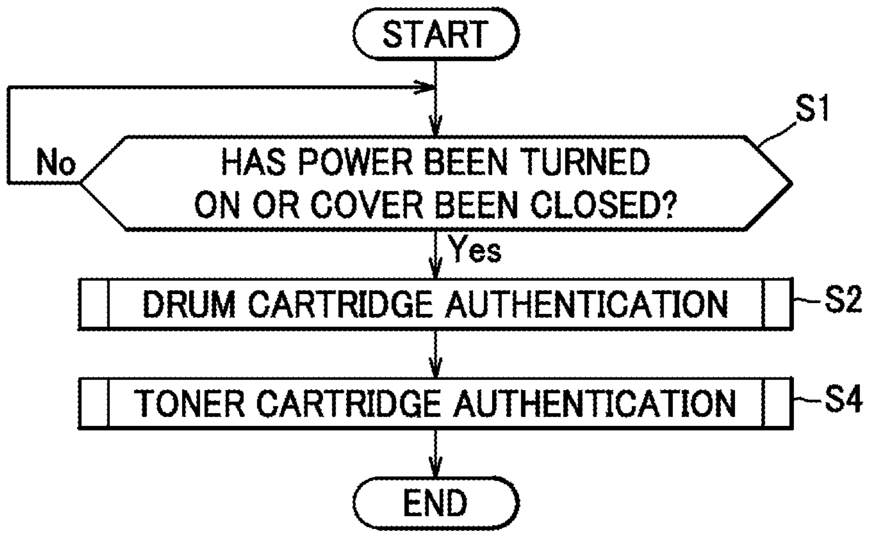
FIG. 4 is a flow chart showing an example process of the controller for authentication of the drum cartridge and the toner cartridge.

As shown in FIG. 4, when the controller 100 determines that the power of the image forming apparatus 1 is turned on or the front cover 23 is closed (S1, Yes), the controller 100 executes authentication of the drum cartridge (S2) based on the assumption that the toner cartridge 9 is changed, and then executes authentication of the toner cartridge 9 (S4). When the controller 100 determines that neither the power is turned on nor the front cover 23 is closed (S1, No), the controller 100 waits until the power of the image forming apparatus 1 is turned on or the front cover 23 is closed.

Next, authentication of the drum cartridge (S2) will be explained with reference to FIG. 5.

Figure 5:
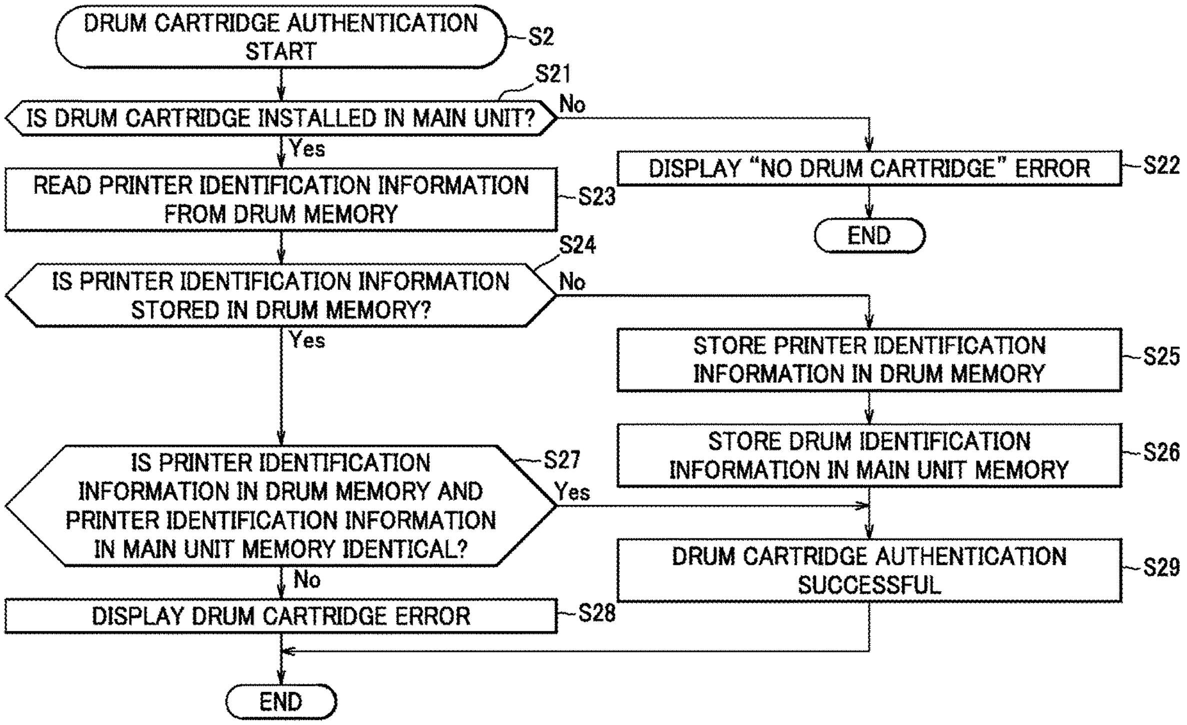
FIG. 5 is a flow chart showing a process for authentication of the drum cartridge.

As shown in FIG. 5, the controller 100 determines whether a drum cartridge 8 is installed in the apparatus main unit 2 (S21).

In step 21, when the controller 100 determines that a drum cartridge 8 is not installed in the apparatus main unit 2 (S21, No), the controller 100 causes a "no drum cartridge" error to be displayed on the display 26 (S22) and ends the process.

In step 21, when the controller 100 determines that a drum cartridge 8 is installed in the apparatus main unit 2 (S21, Yes), the controller 100 reads printer identification information from the drum memory 85 (S23), and determines whether printer identification information is stored in the drum memory 85 (S24).

In step S24, when the controller 100 determines that printer identification information is not stored in the drum memory 85 (S24, No), this indicates that the drum cartridge 8 is new. Therefore, the controller 100 stores in the drum memory 85 the printer identification information obtained from the main unit memory 110 (S25), stores in the main unit memory 110 the drum identification information obtained from the drum memory 85 (S26), determines that authentication of the drum cartridge has succeeded (S29), and ends the process.

In step S24, when the controller 100 determines that printer identification information is stored in the drum memory 85 (S24, Yes), the controller 100 determines whether the printer identification information in the drum memory 85 and the printer identification information in the main unit memory 110 are identical (S27).

In step 27, if the controller 100 determines that the printer identification information in the drum memory 85 and the printer identification information in the main unit memory 110 are not identical (S27, No), the controller 100 causes a drum cartridge error to be displayed on the display 26 and ends the process.

In step S27, if the controller 100 determines that the printer identification information in the drum memory 85 and the printer identification information in the main unit memory 110 are identical (S27, Yes), the controller 100 determines that authentication of the drum cartridge succeeds (S29) and ends the process.

Next, authentication of the drum cartridge (S4) will be explained with reference to FIG. 6.

Figure 6:
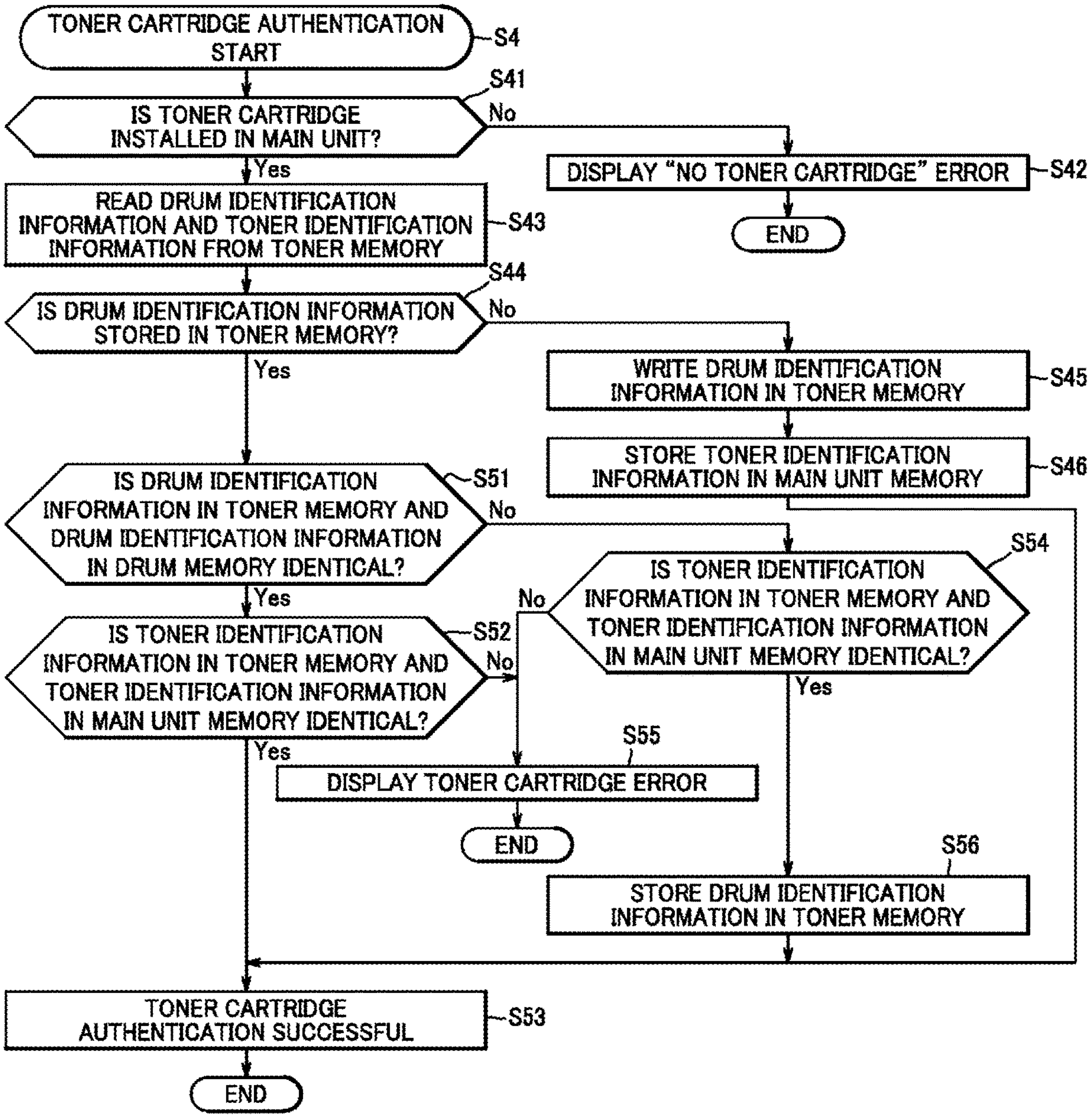
FIG. 6 is a flow chart showing a process for authentication of the toner cartridge.

As shown in FIG. 6, the controller 100 determines whether a toner cartridge 9 is installed in the apparatus main unit 2 (S41).

In step S41, if the controller 100 determines that a toner cartridge 9 is not installed in the apparatus main unit 2 (S41, No), the controller 100 causes a "no toner cartridge" error to be displayed on the display 26 (S42) and ends the process.

In step S41, when the controller 100 determines that a toner cartridge 9 is installed in the apparatus main unit 2 (S41, Yes), the controller 100 reads drum identification information and toner identification information from the toner memory 95 (S43), and determines whether drum identification information is stored in the toner memory 95 (S44).

In step 44, when the controller 100 determines that drum identification information is not stored in the toner memory 95 (S44, No), this indicates that the toner cartridge 9 is new. Therefore, the controller 100 stores in the toner memory 95 the drum identification information obtained from the drum memory 85 or the main unit memory 110 (S45), stores in the main unit memory 110 the toner identification information obtained from the toner memory 95 (S46), determines that authentication of the toner cartridge succeeds (S53), and ends the process.

In step 44, when the controller 100 determines that drum identification information is stored in the toner memory 95 (S44, Yes), the controller determines whether the drum identification information in the toner memory 95 and the drum identification information in the drum memory 85 are identical (S51).

In step S51, when the controller 100 determines that the drum identification information in the toner memory 95 and the drum identification information in the drum memory 85 are identical (S51, Yes), the controller 100 determines whether the toner identification information in the toner memory 95 and the toner identification information in the main unit memory 110 are identical (S52).

In step S52, when the controller 100 determines that the toner identification information in the toner memory 95 and the toner identification information in the main unit memory 110 are identical (S52, Yes), the controller 100 determines that authentication of the toner cartridge 9 succeeds (S53) and ends the process.

In step S52, if the controller 100 determines that the toner identification information in the toner memory 95 and the toner identification information in the main unit memory 110 are not identical (S52, No), the controller 100 causes a toner cartridge error to be displayed on the display 26 (S55) and ends the process.

In step S51, when the controller 100 determines that the drum identification information in the toner memory 95 and the drum identification information in the drum memory 85 are not identical (S51, No), the controller 100 determines whether the toner identification information in the toner memory 95 and the toner identification information in the main unit memory 110 are identical (S54).

In step S54, when the controller 100 determines that the toner identification information in the toner memory 95 and the toner identification information in the main unit memory 110 are not identical (S54, No), the controller 100 causes a toner cartridge error to be displayed on the display 26 (S55) and ends the process.

In step S54, when the controller 100 determines that the toner identification information in the toner memory 95 and the toner identification information in the main unit memory 110 are identical (S54, Yes), the controller 100 stores in the toner memory 95 the drum identification information obtained from the drum memory 85 (S56), determines that authentication of the toner cartridge 9 succeeds (S53), and ends the process.

A detail process executed by the controller 100 when a new drum cartridge 8 and a new toner cartridge 9 are installed in the apparatus main unit 2 will be explained with reference to FIGS. 7 to 9.

To begin with, referring to FIGS. 7*a* and 7*b*, installation of a new drum cartridge 8 and a new toner cartridge 9 in an image forming apparatus used for the first time will be explained.

Figure 7A:
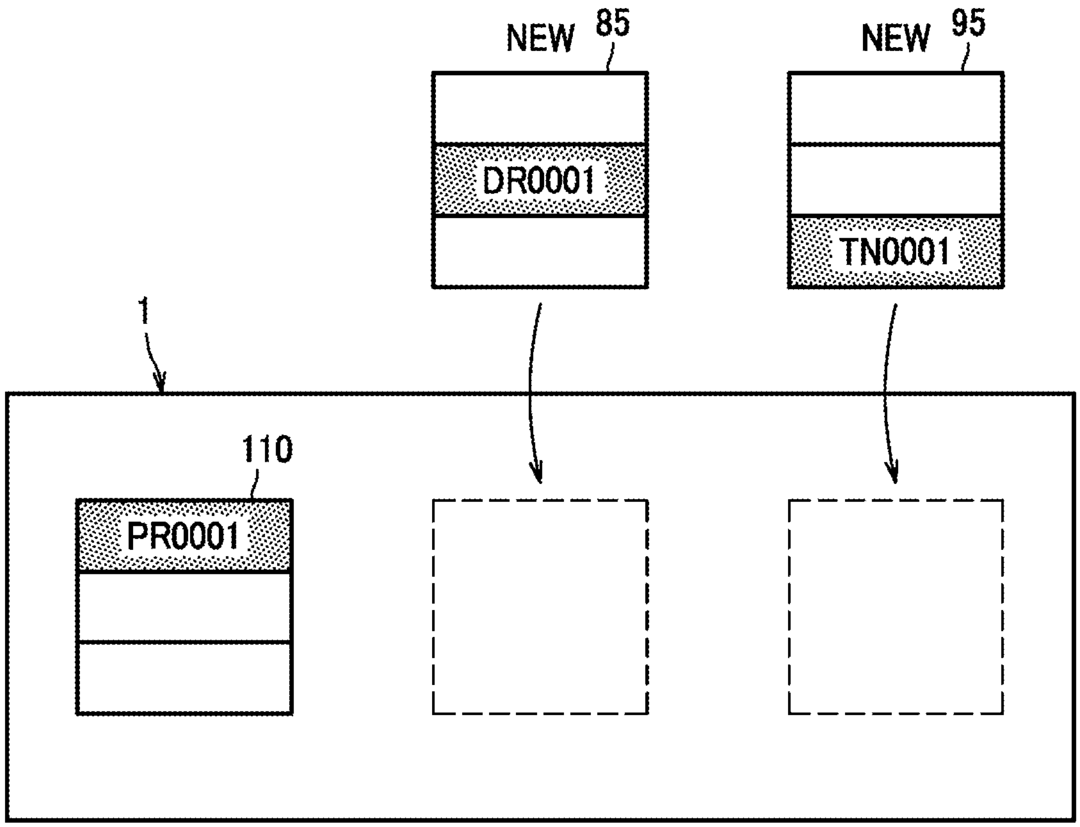
FIG. 7A is a diagram showing an apparatus main unit before installing a new drum cartridge and a new toner cartridge.

As shown in FIG. 7A, the main unit memory 110 of an unused image forming apparatus stores printer identification information PR001. The drum memory 85 of a new drum cartridge 8 stores drum identification information DR0001. The toner memory 95 of a new toner cartridge 9 stores toner identification information TN0001.

Figure 7B:
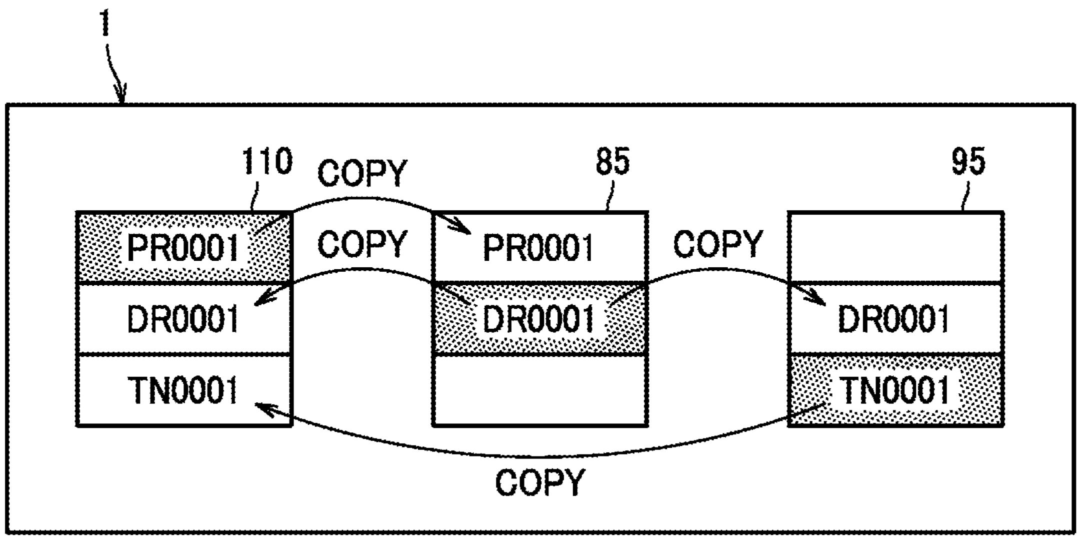
FIG. 7B is a diagram showing the apparatus main unit after installing a new drum cartridge and a new toner cartridge.

As shown in FIG. 7B, when a new drum cartridge 8 is installed in an unused image forming apparatus 1, the controller 100 determines that the installed drum cartridge 8 is new since no information is stored in a specific storage area of the drum memory 85 for storing printer identification information. Then, the controller 100 copies and stores in the main unit memory 110 the drum identification information DR0001 stored in the drum memory 85, and copies and stores in the drum memory 85 the printer identification information PR0001 stored in the main unit memory 110.

When a new toner cartridge 9 is installed in an unused image forming apparatus 1, the controller 100 determines that the installed toner cartridge 9 is new since no information is stored in a specific storage area of the toner memory 95 for storing printer identification information. Then, the controller 100 copies and stores in the main unit memory 110 the toner identification information TN0001 stored in the toner memory 95, and copies and stores in the toner memory 95 the drum identification information DR0001 stored in the main unit memory 110 or the drum memory 95.

Next, with reference to FIGS. 8A and 8B, installation of a new toner cartridge 9 performed from the state shown in FIG. 7B will be explained.

Figure 8A:
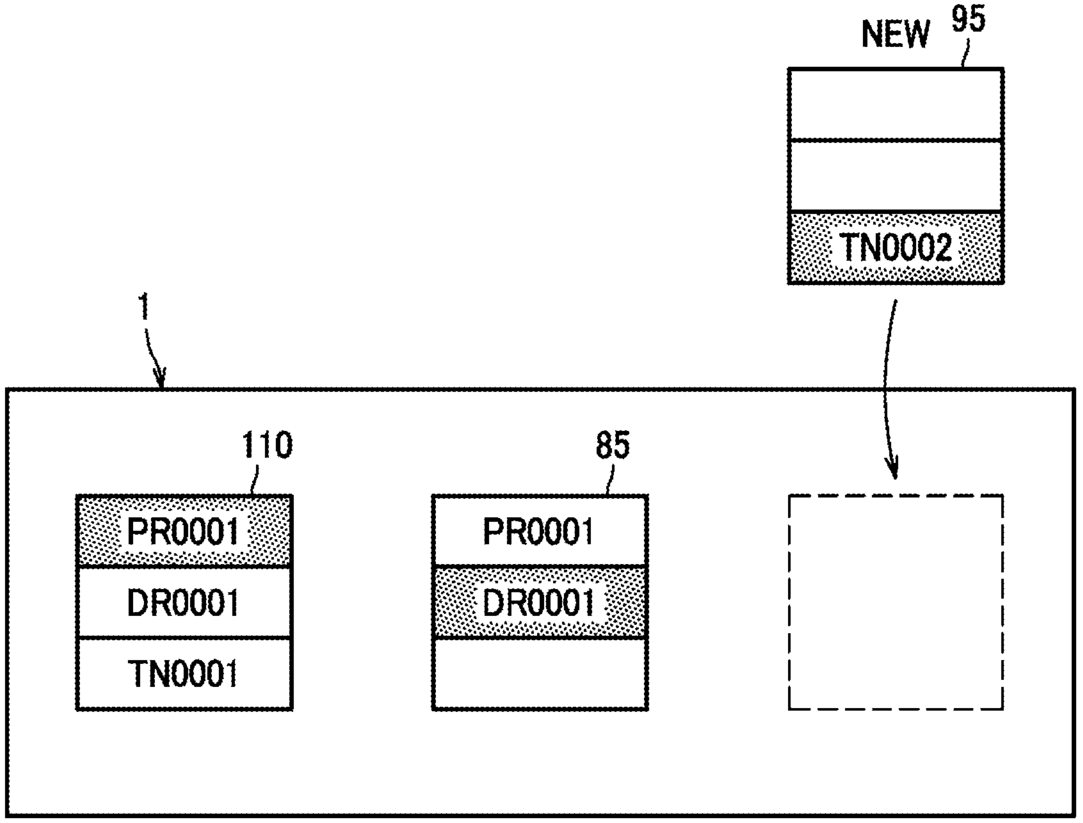
FIG. 8A is a diagram showing the apparatus main unit before installing a new toner cartridge.
Figure 8B:
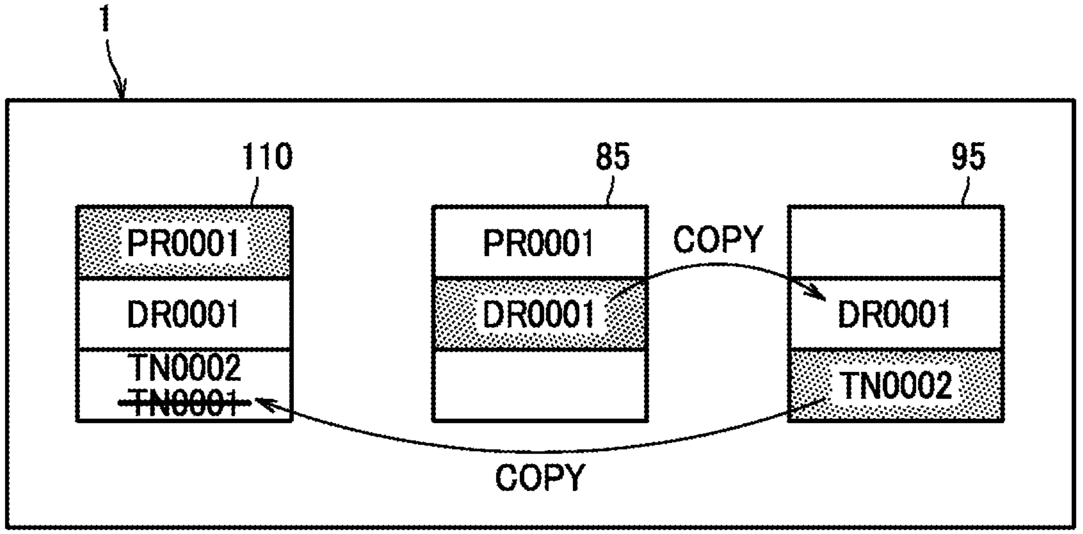
FIG. 8B is a diagram showing the apparatus main unit after installing a new toner cartridge.

As shown in FIG. 8A, the toner memory 95 of a new toner cartridge 9 stores toner identification information TN0002. As shown in FIG. 8B, when a new toner cartridge 9 is installed in the image forming apparatus 1, the controller 100 determines that the installed toner cartridge 9 is new since no information is stored in a specific storage area of the toner memory 95 for storing printer identification information. Then, the controller 100 copies and stores in the main unit memory 110 (overwrites the existing data TN0001 with) the toner identification information TN0002 stored in the toner memory 95, and copies and stores in the toner memory 95 the drum identification information DR0001 stored in the main unit memory 110 or the drum memory 95.

Next, with reference to FIGS. 9A and 9B, installation of a new drum cartridge 8 performed from the state shown in FIG. 8B will be explained.

Figure 9A:
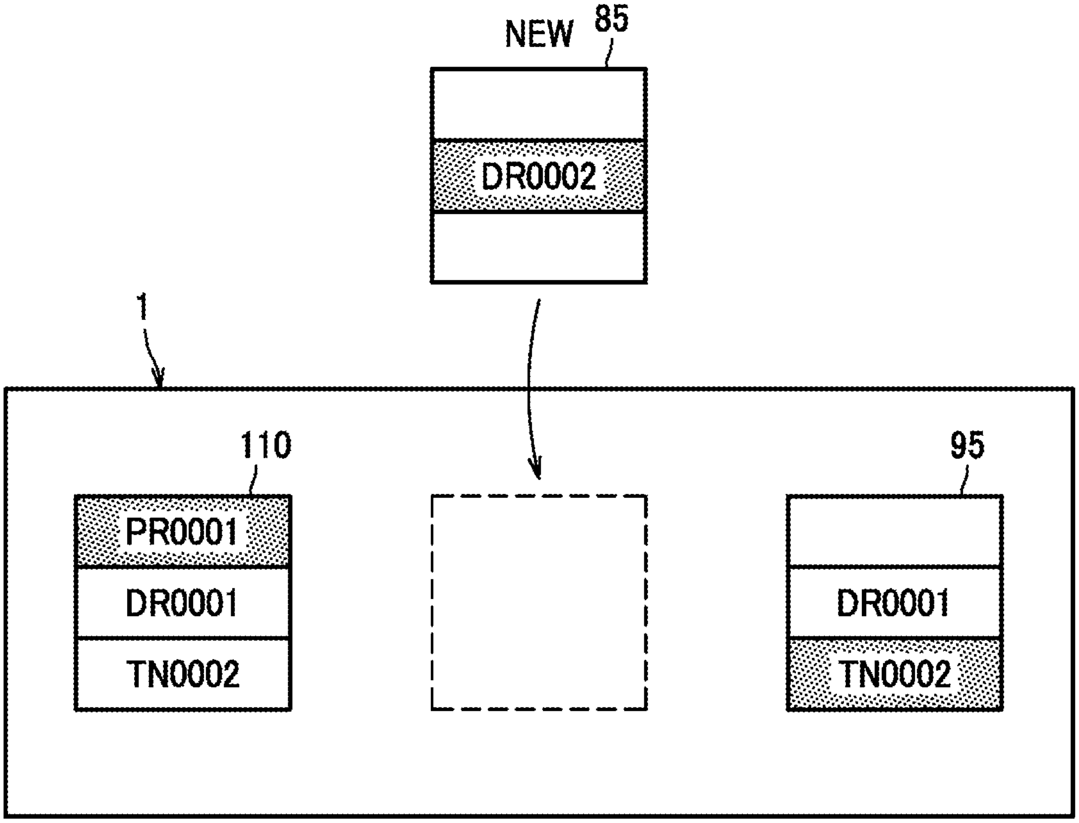
FIG. 9A is a diagram showing the apparatus main unit before installing a new drum cartridge.
Figure 9B:
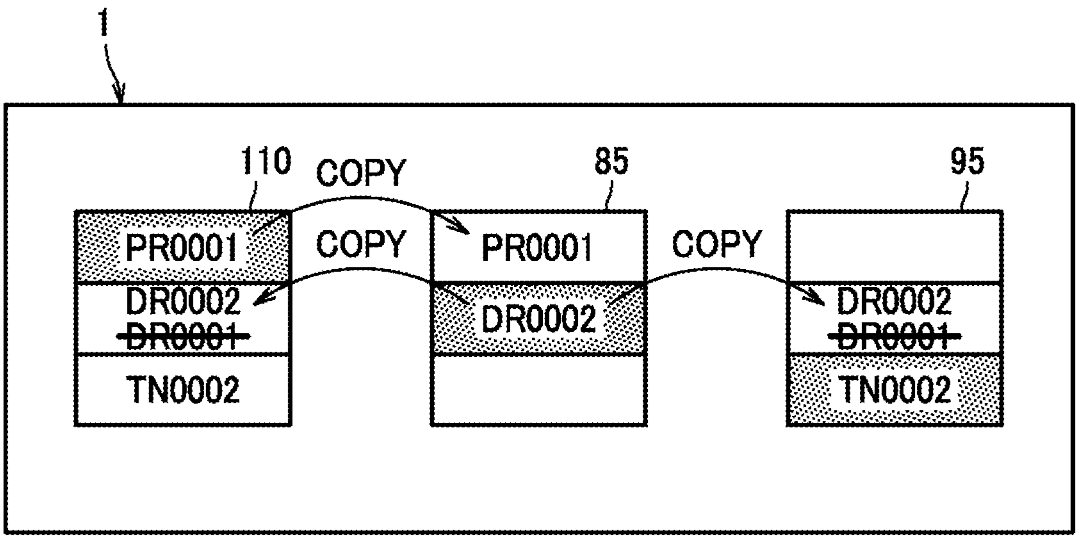
FIG. 9B is a diagram showing the apparatus main unit after installing a new drum cartridge.

As shown in FIG. 9A, the drum memory 85 of a new drum cartridge 8 stores drum identification information DR0002. As shown in FIG. 9B, when a new drum cartridge 8 is installed in the image forming apparatus 1, the controller 100 determines that the installed drum cartridge 8 is new since no information is stored in a specific storage area of the drum memory 85 for storing printer identification information.

Subsequently, the controller 100 determines whether the drum identification information stored in the drum memory 85 and the drum identification information stored in the toner memory 95 are identical, and whether the toner identification information stored in the toner memory 95 and the toner identification information stored in the main unit memory 110 are identical. Herein, the controller 100 determines that the drum identification information DR0001 in the toner memory 95 and the drum identification information DR0002 in the drum memory 85 are not identical. Further, the controller 100 determines that the toner identification information TN0002 in the toner memory 95 and the toner identification information TN0002 in the main unit memory 110 are identical Accordingly, as shown in FIG. 9B, the controller 100 copies and stores in the toner memory 95 and the main unit memory 110 (overwrites the existing data DR001 with) the drum identification information DR0002 stored in the drum memory 85. Further, the controller 100 copies and stores in the drum memory 85 the printer identification information PR0001 stored in the main unit memory 110.

The following advantages can be obtained by the image forming apparatus 1 as described above.

Conventionally, in an image forming apparatus in which two types of cartridges, i.e., a drum cartridge and a toner cartridge, are installable, it is not possible to recognize that a drum cartridge that had been installed in another image forming apparatus is installed in the apparatus main unit or that a toner cartridge that had been installed in another image forming apparatus is installed in the apparatus main unit.

However, according to the image forming apparatus 1 in which two types of cartridges, i.e., a drum cartridge and a toner cartridge, are installable, when a new drum cartridge 8 is installed in the image forming apparatus 1, printer identification information can be stored in the drum memory 85, and when a new toner cartridge 9 is installed in the image forming apparatus 1, drum identification information can be stored in the toner memory 95. Therefore, when a drum cartridge 8 that is not new is installed in the apparatus main unit 2, the controller 100 can recognize that a drum cartridge 8 that had been installed in another image forming apparatus is installed in the apparatus main unit 2 since printer identification information is stored in the drum memory 85. Further, when a toner cartridge 9 that is not new is installed in the apparatus main unit 2, the controller 100 can recognize that a toner cartridge 9 that had been installed in another image forming apparatus is installed in the apparatus main unit 2 since drum identification information is stored in the toner memory 95.

As a result, the image forming apparatus 1 can recognize that a cartridge had been installed in another image forming apparatus with respect to two types of cartridges, the drum cartridge 8 and the toner cartridge 9.

When a toner cartridge 9 that is not new is installed in the apparatus main unit 2, even if the drum identification information stored in the drum memory 85 and the drum identification information stored in the toner memory 95 are not identical, when the toner identification information stored in the main unit memory 110 and the toner identification information stored in the toner memory 95 are identical, the controller 100 stores in the toner memory 95 the drum identification information stored in the drum memory 85. Therefore, the controller 100 can allow continued use of the toner cartridge 8 when the drum cartridge 8 is new, or if the drum cartridge 8 had been installed in another image forming apparatus, as long as the toner cartridge 9 had not been installed in another image forming apparatus.

When a toner cartridge 9 that is not new is installed in the apparatus main unit 2, and the drum identification information stored in the main unit memory 110 and the drum identification information stored in the toner memory 95 are identical, the controller 100 may allow execution of image forming. Further, when a toner cartridge that is not new is installed in the apparatus main unit 2, the controller 100 may prohibit execution of image forming when the drum identification information in the drum memory 85 and the drum identification information in the toner memory 95 are not identical. Therefore, when a toner cartridge 9 that had been installed in another image forming apparatus is installed in the apparatus main unit 2, execution of image forming can be prohibited.

It is to be understood that the illustrative, non-limiting configuration and features of the image forming apparatus described above may be modified into various configurations as exemplified below.

The controller described above allows execution of image forming when authentication of the drum cartridge and authentication of the toner cartridge are successful. However, execution of image forming may be allowed even when authentication of the drum cartridge and authentication of the toner cartridge are not successful.

In the image forming device 1 described above, the toner cartridge 9 is attachable and detachable to the drum cartridge 8. However, the toner cartridge and the drum cartridge may be independently attachable and detachable to the apparatus main unit.

Although a monochromatic laser printer is given as an example of an image forming apparatus, the image forming apparatus may be a color laser printer, a copy machine or a multifunction machine.

The elements described in the above disclosure and modifications may be implemented selectively and in combination.

What is claimed is:

1. An image forming apparatus comprising:

a main unit;

a main unit memory that stores printer identification information which identifies the image forming apparatus;

a toner cartridge installed in the main unit, the toner cartridge including a case containing toner inside;

a unit for use with the toner cartridge, the unit being installable in and removable from the main unit, and a unit memory that stores unit identification information which identifies the unit; and a controller, wherein the controller is configured to:

determine whether the unit installed in the main unit is new; and store in the main unit memory the unit identification information stored in the unit memory, when the controller determines that the unit installed in the main unit is new.

2. The image forming apparatus according to claim 1, wherein the controller is configured to:

determine whether information is stored in a specific storage area of the unit memory; and determine that the unit installed in the main unit is new, when the controller determines that information is not stored in the specific storage area of the unit.

3. The image forming apparatus according to claim 1, wherein the unit is a drum cartridge including a photoconductor drum.

* * * * *